United States Patent [19]

Zhang et al.

[11] Patent Number: 5,485,159
[45] Date of Patent: Jan. 16, 1996

[54] APPARATUS AND METHOD TO DETECT RADAR RADOME OBSTRUCTION

[75] Inventors: Zhaohong Zhang; Mark F. Henderson, both of Kokomo, Ind.

[73] Assignee: Delco Electronics Corporation, Kokomo, Ind.

[21] Appl. No.: 299,168

[22] Filed: Aug. 24, 1994

[51] Int. Cl.$^6$ .............................. G01S 7/40; G08B 19/02
[52] U.S. Cl. .......................... 342/165; 342/173; 340/580
[58] Field of Search ................................... 342/165, 173, 342/174, 169, 170; 340/580

[56] References Cited

U.S. PATENT DOCUMENTS

| | | | |
|---|---|---|---|
| 4,097,796 | 6/1978 | Lunden | 342/165 |
| 4,697,184 | 9/1987 | Cheal et al. | 342/169 |
| 4,766,369 | 8/1988 | Weinstein | 340/580 |
| 4,797,660 | 1/1989 | Rein, Jr. | 340/580 |
| 5,134,380 | 7/1992 | Jonas | 340/580 |
| 5,371,505 | 12/1994 | Michaels | 342/165 |
| 5,394,340 | 2/1995 | Inkpen et al. | 340/580 |

*Primary Examiner*—Charles T. Jordan
*Assistant Examiner*—Theresa M. Wesson
*Attorney, Agent, or Firm*—Mark A. Navarre

[57] ABSTRACT

Detection means having thin wire electrodes that are placed on the outer surface of a radome that shelters an antenna used for transmitting and/or receiving intelligence in the form of radio waves, such as those microwave signals used in radar, especially radar that is used for a vehicle. The thin wire electrodes are placed on the radome surface in a way which will not change antenna characteristics. The electrodes measure the electrical resistance of the obstruction material, such as wet mud, that may find its way onto the outer surface of the radome during the operation of the vehicle and that may reduce the sensitivity of the radar's receiver so as to prevent it from recognizing otherwise discernable echo information. The detection means, upon detecting a predetermined electrical resistance of the obstruction material, provides a signal that is routed to the operator that is indicative that the radar performance may have degraded beyond an acceptable limit.

3 Claims, 9 Drawing Sheets

APPARATUS AND METHOD TO DETECT RADAR RADOME OBSTRUCTION

TECHNICAL FIELD

The present invention relates to means for detecting obstruction material accumulated on a radome of an antenna that might degrade the sensitivity of the associated radar system. Specifically, the present invention relates to detection means for detecting a predetermined electrical resistance of the obstruction material accumulated on the surface of the radome that may unduly degrade the performance characteristic of the radar system.

BACKGROUND OF THE INVENTION

Radar systems commonly comprise a plastic housing, known as a radome, that shelters a transmitting/receiving antenna assembly of the radar system. Under certain circumstances, some materials (such as mud, water, ice, etc.) could accumulate on the surface of the radar radome and may sometimes cause severe attenuation of the transmitted or received radar signals and, thereby, degrade the performance of the radar system to an unacceptable limit.

SUMMARY OF THE INVENTION

It is, therefore, a primary object of the present invention to provide a radar system that incorporates a radome with a means for detecting and determining that obstruction material accumulated on the radome has degraded the performance of the radar system below an acceptable limit.

Another object of the present invention is to provide detection means that detects obstruction material accumulated on a radome that might degrade the performance of the radar and to do so without distorting or reducing the transmitted or received microwave radar signals.

It is a further object of the present invention to provide detecting means for detecting accumulated obstruction material on a radome that might disadvantageously affect the radar performance and to notify the operator when the radar's performance has reached an unacceptable level.

Other objects of the present invention, as well as advantages thereof over existing prior art forms, which will be apparent in view of the following description, are accomplished by means hereinafter described and claimed.

In general, the radar system embodying the concepts of the present invention measures the electrical impedance of the obstruction material on the radome surface which is a function of the conductivity and thickness of the obstruction material to determine electrical resistance thereof which, in turn, determines the level of degradation of the radar performance.

To appreciate the invention in its operative environment, the detection means of the present invention is selected so that the operator will be notified when the obstruction material has attenuated the transmitted and/or received signals to an unacceptable predetermined level, such as three (3) dB.

In one embodiment, an antenna system is disclosed that comprises an antenna, a radome, a pair of spaced-apart electrodes, and detection means connected to the spaced-apart electrodes. The radome shelters the antenna and has an outer surface susceptible to accumulating obstruction material having a measurable electrical resistance. The pair of spaced-apart electrodes are affixed to the outer surface of the radome and are connected to means for detecting and measuring the electrical resistance of the obstruction material. The existence of those electrodes does not affect the performance of the antenna. The detecting and measuring means provides a control signal that is used to notify the operator that the overall performance of the radar system has reached an unacceptable limit.

DESCRIPTION OF EXEMPLARY EMBODIMENTS

Figure 1:
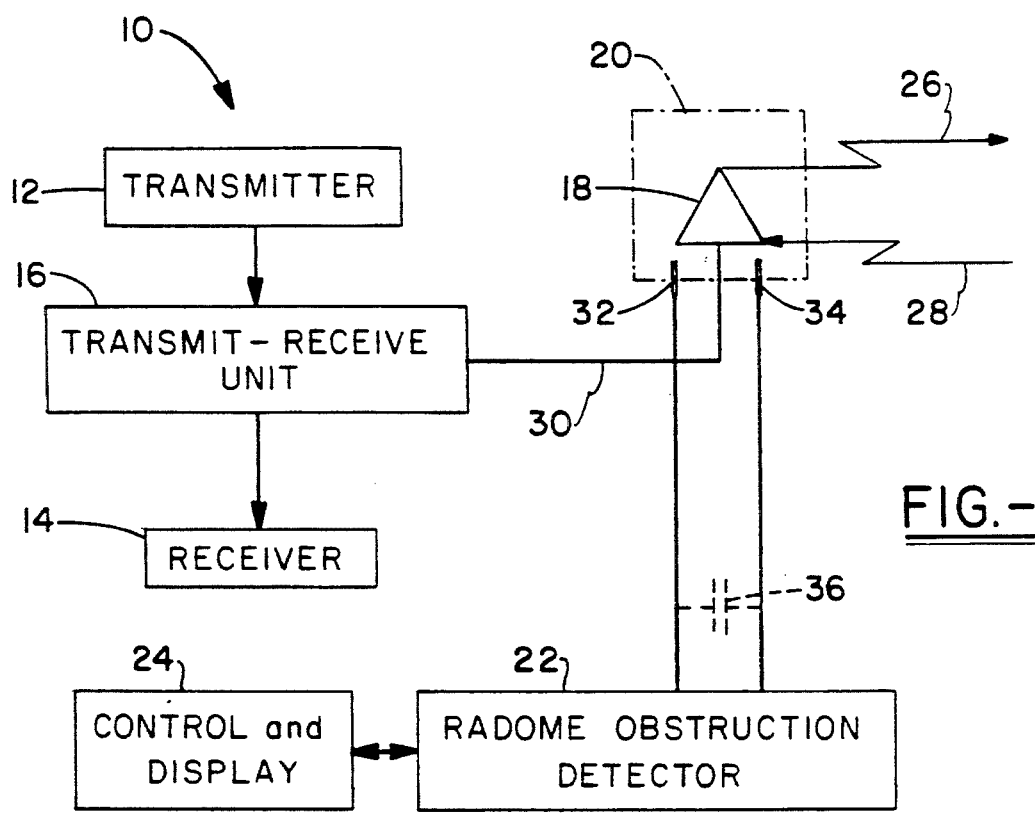
FIG. 1 is a block diagram of the radar system of the present invention.

Referring to the drawings, wherein like reference numbers designate like elements, there is shown in FIG. 1 a block diagram of the radar system 10 according to the present invention. In general, the radar system 10 serves to detect and locate objects that may not be within the range of human vision. The radar system 10 furnishes data with a high degree of repetivity and precision and is unaffected by impediments to human vision, such as fog or poor lighting conditions. The radar system 10 comprises a plurality of elements each having a reference number and all of which are shown in Table 1.

TABLE 1

| REFERENCE NO. | ELEMENT |
|---|---|
| 12 | Transmitter Unit |
| 14 | Receiver Unit |
| 16 | Transmit-Receive Unit |
| 18 | Transmitting/Receiving Antenna |
| 20 | Radome |
| 22 | Radome Obstruction Detection Means |
| 24 | Control and Display Means |

The radar system 10 used for automotive applications employs the radome 20, ULTEM 1000 available from the General Electric Company for example, to shelter the antenna 18. The radome obstruction detection means 22 is connected, by means of spaced-apart electrodes 32 and 34, to the exposed outer surface of the radome 20. The electrodes 32 and 34 preferably have a RF bypass capacitor 36 connected thereacross so that, as is to be more fully described, the radome obstruction detection means essentially measures surface resistance R. The radome obstruction detection means 22 is also connected and responsive to control and display means 24.

Under certain conditions, some materials (such as mud, water, ice, etc.) could accumulate on the surface of the radar radome 20 during the operation of the radar system 10. Although microwave signals are generally less sensitive to these obstruction materials as compared to other reflective materials, the existence of these materials on the surface of the radome may sometimes cause significant signal attenuation to the transmitted signals 26 and, more importantly, to the return signals 28 from targets. Radar systems, not having the benefits of the present invention, may suffer severe performance degradation if either signal attenuation, i.e., signals 26 or 28 reaches a certain level, such as three (3) dB. The present invention provides the radome obstruction detection means 22 which safeguards against such system performance degradation going unnoticed.

In general, the radome obstruction detection means 22 measures the electrical resistance of the obstruction material accumulated between the spaced-apart electrodes 32 and 34. The radome obstruction is a function of the conductivity and the thickness of the obstruction material. The determination that the conductivity and thickness parameters are indicative of undesired signal attenuation was determined, in the practice of this invention, by a mathematical model of the radome obstruction material based on electromagnetic theory, and by performing experimental testing of the obstruction material in the form of mud accumulated on the outer surface of the radome 20. A statistical analysis was then performed on the test data and the results of which were compared to the mathematical model to further support the conclusions of the present invention. The mathematical model of the obstruction material may be further described with reference to FIG. 2 which makes reference to symbols having a general definition given in Table 2.

TABLE 2

| SYMBOL | GENERAL DEFINITION |
|---|---|
| $\Gamma$ | Reflection coefficient of radome surface |
| $\sigma$ | Conductivity of obstruction material |
| d | Thickness of obstruction material |
| $\beta$ | Propagation constant of obstruction |

TABLE 2-continued

| SYMBOL | GENERAL DEFINITION |
|---|---|
| $\epsilon$ | Dielectric constant of the obstruction material |
| $Z_o$ | Characteristic impedance of Air (377 $\Omega$) |
| $Z_t$ | Characteristic impedance of the obstruction material |

Figure 2A:
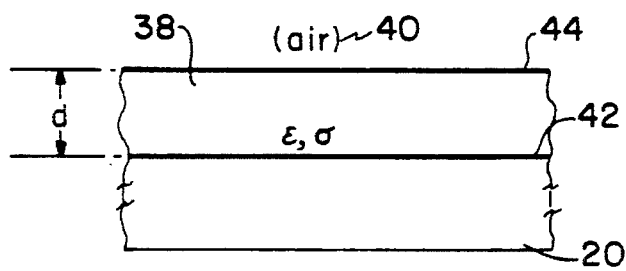
FIG. 2 is composed of FIGS. 2(a), (b) and (c) that cumulatively illustrates some of the parameters that are considered in the determination that obstruction material accumulated on the outer surface of the radome of FIG. 1 has degraded the performance of the radar system of FIG. 1 to an unaccepwble level.
Figure 2B:
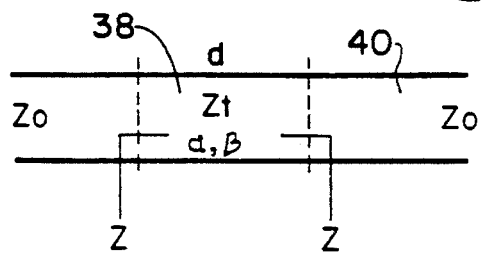
Figure 2C:
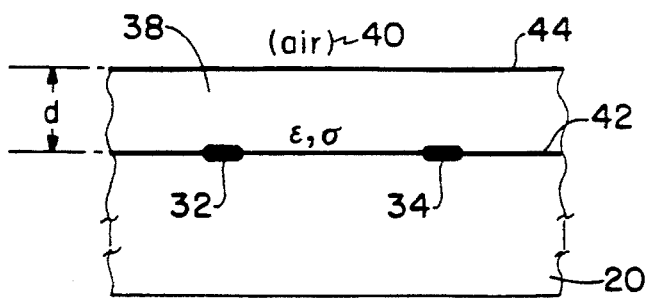

FIG. 2 is composed of FIGS. 2(a), (b) and (c), wherein FIGS. 2(a) and 2(b) respectively illustrate obstruction material 38 being located on the outer surface of radome 20 and a transmission line model of the obstruction material 38. The obstruction material 38 accumulated on radome 20 causes two different types of problems, i.e., reflections and absorptions of the related signal, each of which problem, in turn, causes attenuation of the related signals. The reflection problem is caused by a dielectric discontinuity at the interface between the radome 20 and air 40. More particularly, as seen in FIG. 2(a), the obstruction material 38, being interposed between radome 20 and air 40, creates two different interfaces 42 and 44, with the obstruction material 38 causing a mismatch between the intended and designed impedances of the radome 20 and the air 40. The signal attenuation due to reflection is given by the below expression 1:

Expression 1:

$$\text{Signal Attenuation} = 20 \log_{10}(1 - 3\Gamma^2)$$

where $\Gamma$ is the reflection coefficient at the radome surface, more particularly interface 42, which is defined by the below expression 2:

Expression 2:

$$\Gamma = (Z - Z_o)/Z + Z_o$$

where impedance Z is given by the below expression 3:

Expression 3:

$$Z = Z_t \left((Z_o + jZ_t \tan\beta d)/(Z_t + jZ_o \tan\beta d)\right)$$

where $Z_o$ is the characteristic impedance of air (337$\Omega$), and $Z_t$ and $\beta$ are respectively the characteristic impedance and propagation constant of the obstruction material 38. d is the thickness of the obstruction material 38 and $Z_t$ and $\beta$ are determined by the dielectric constant $\epsilon$ of the obstruction material 38. For the sake of simplifying the expressions (1)– (8) without unduly limiting their accuracy, the parameters of the radome 20 and air 40 are assigned the same electrical characteristics.

As previously mentioned, the second cause for signal attenuation is the signal absorption created by the conductivity characteristic of the obstruction material 38. It may be shown, by those skilled in the art, from electromagnetic theory that signal attenuation due to signal absorption is proportional to the product of the conductivity $\sigma$ and the thickness d parameters of the obstruction material 38 and has the relationship given by the below expression 4:

Expression 4:

$$\text{Signal Attenuation (dB)} \propto \sigma d$$

where the symbol $\alpha$ indicated proportionality.

From expressions (1) through (4), it may be seen that the signal attenuation may be determined by directly measuring the dielectric constant ε (impedance (Z) parameters), the conductivity σ, and the thickness d parameters of the obstruction material 38, and such measuring may be further described with reference to FIG. 2(*c*).

As seen in FIG. 2(*c*), a pair of spaced-apart electrodes 32 and 34 are located at the interface or outer surface 42 of the radome 20. As will be further described, the electrodes 32 and 34 are used to measure changes in the electrical capacitance and resistance at the outer surface 42. More particularly, the changes in the electrical capacitance and resistance in the obstruction materials 38 occur between the spaced-apart electrodes 32 and 34. The electrical resistance and capacitance of the obstruction material 38 between the electrodes 32 and 34 may be simply referred to herein as surface resistance R and surface capacitance C respectively. The surface capacitance C is approximately proportional to the product of the dielectric constant (ε) and the thickness (d) parameters, both of the obstruction material 38, and has the relationship given by the below expression 5:

Expression 5:

$$C \alpha \varepsilon d$$

The electrical resistance R of the outer surface 42 is approximately inversely proportional to the product of the conductivity (σ) and the thickness (d) parameters of the obstruction material 38 and has the relationship given by the below expression 6:

Expression 6:

$$R \alpha 1/\sigma d$$

The absorption affects created by the obstruction material plays a dominant role, compared to the related reflection affects created by the obstruction material 38, in the signal attenuation and from expressions (4) and (6) it may be determined that the signal attenuation is simply inversely proportional to the surface resistance R and has a relationship that is given by the below expression 7:

Expression 7:

$$\text{Signal Attenuation (dB)} \alpha 1/R$$

Figure 3:
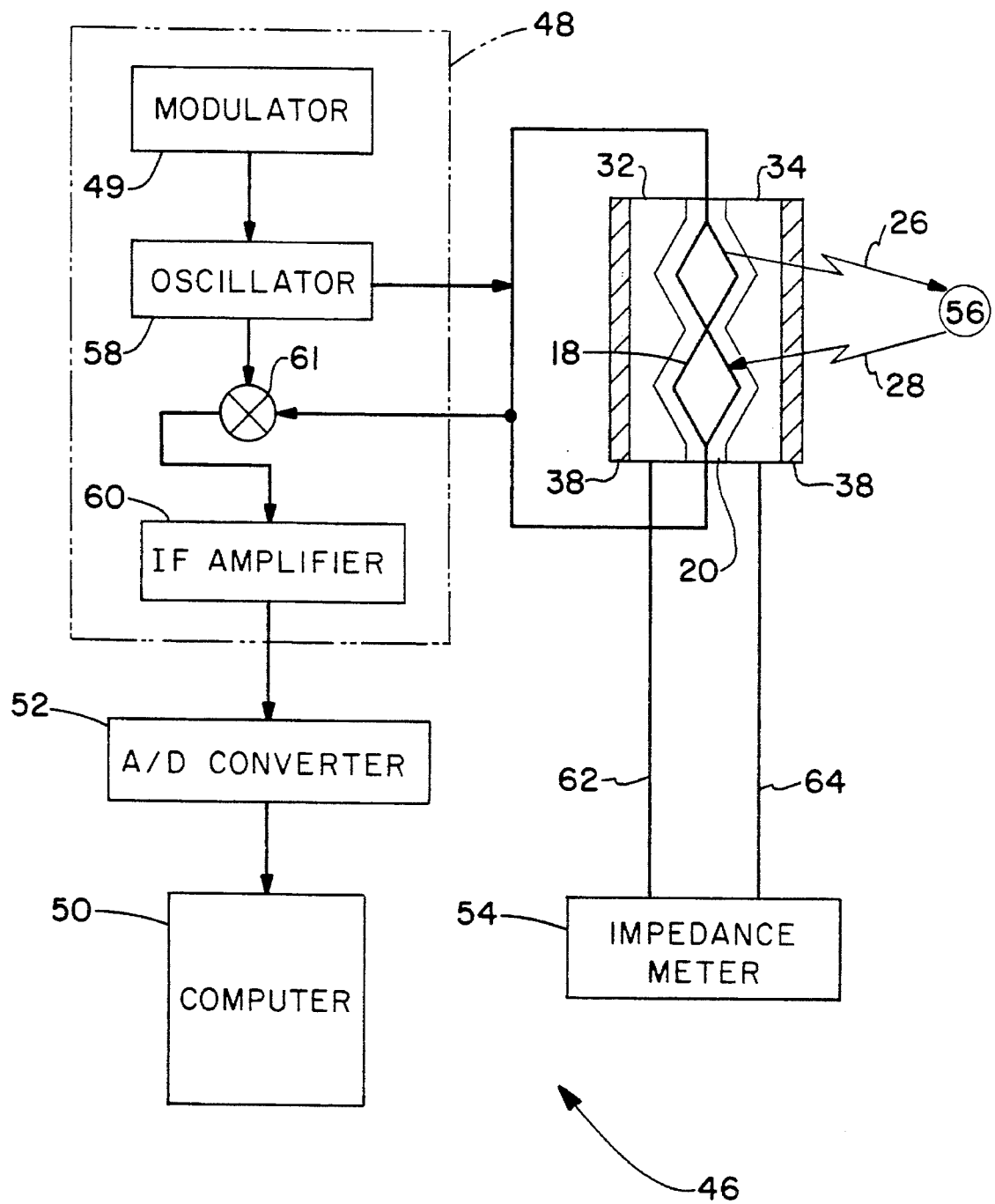
FIG. 3 is a block diagram of a test radar that may be used for gathering data used in the analysis of the obstruction material degradation.
Figure 4A:
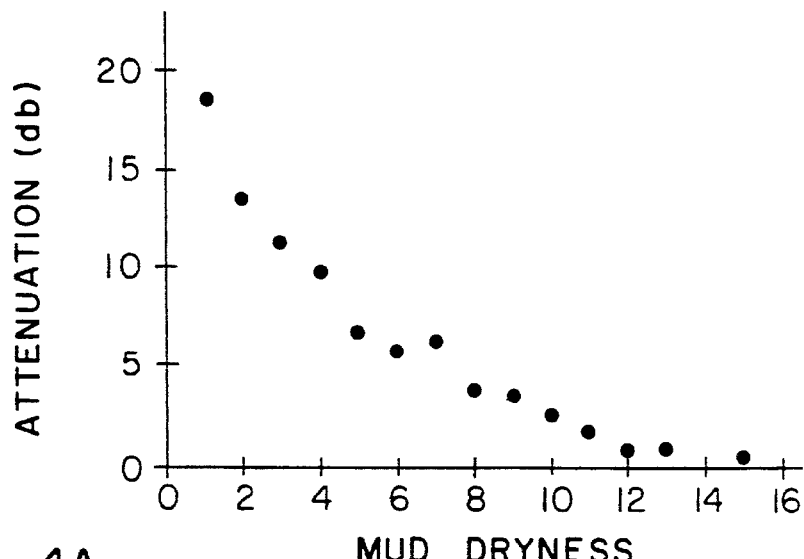
FIG. 4 is composed of FIGS. 4(a), (b) and (c) that cumulatively illustrate test data related to an uneven distribution of mud obstruction on the radome.
Figure 4B:
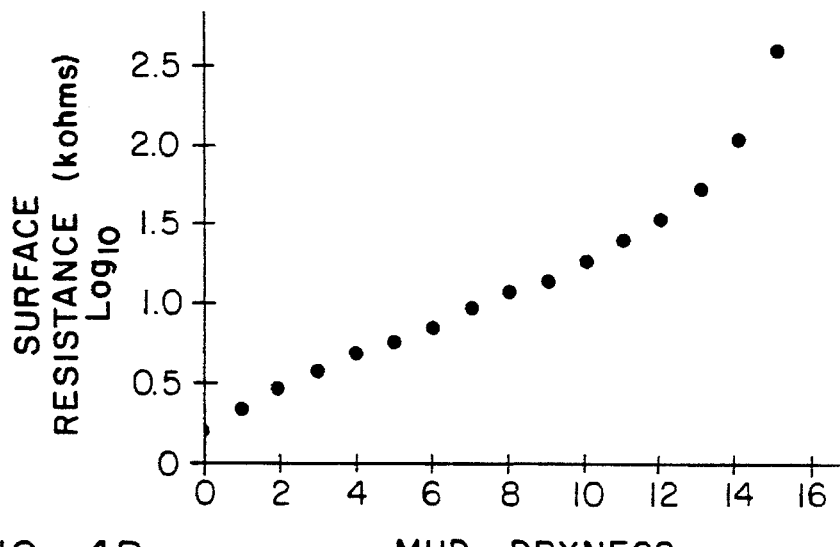
Figure 4C:
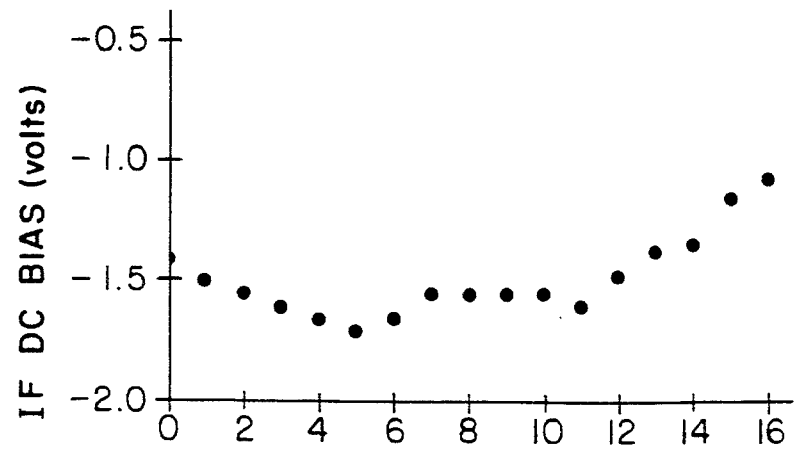
Figure 5A:
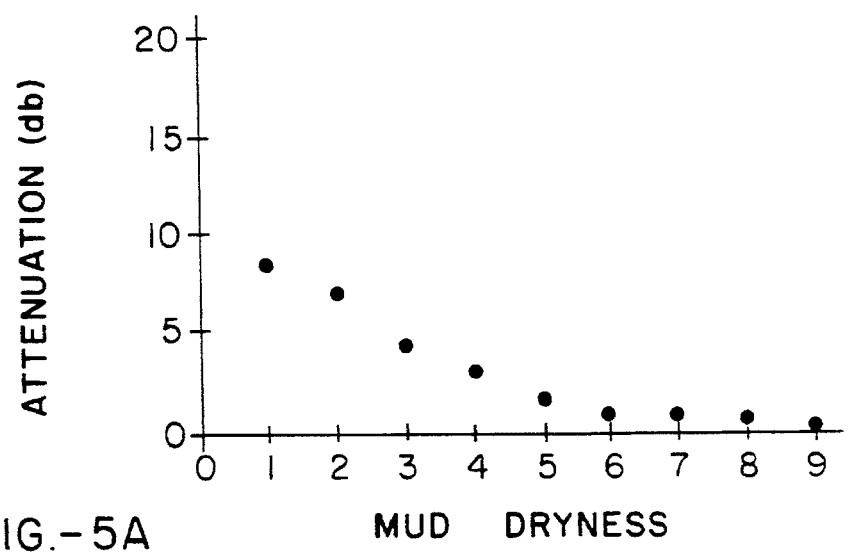
FIG. 5 is composed of FIGS. 5(a), (b) and (c) that cumulatively illustrate test data associated with a mud thickness of 0.03 inches accumulated on the radome.
Figure 5B:
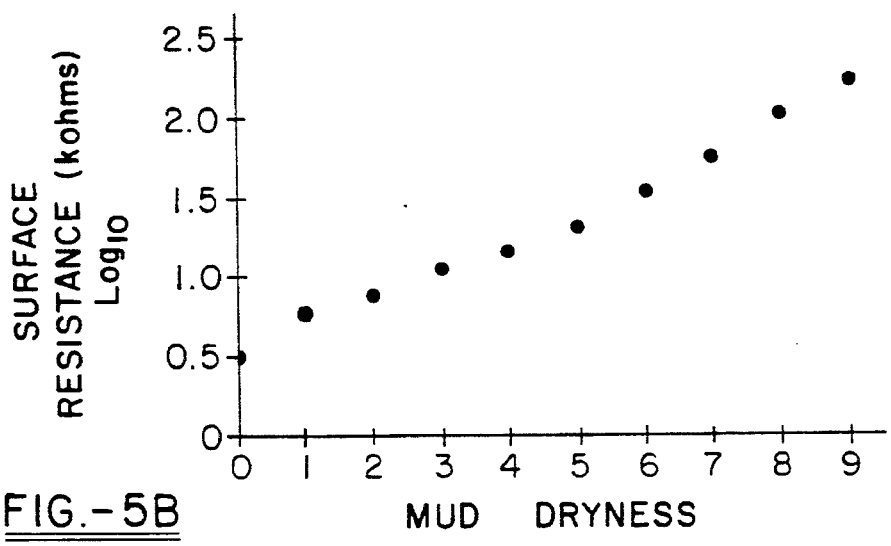
Figure 5C:
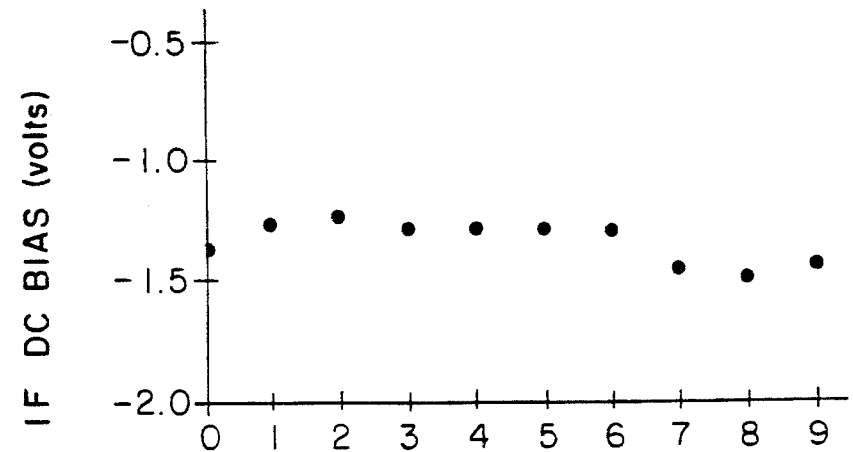
Figure 6A:
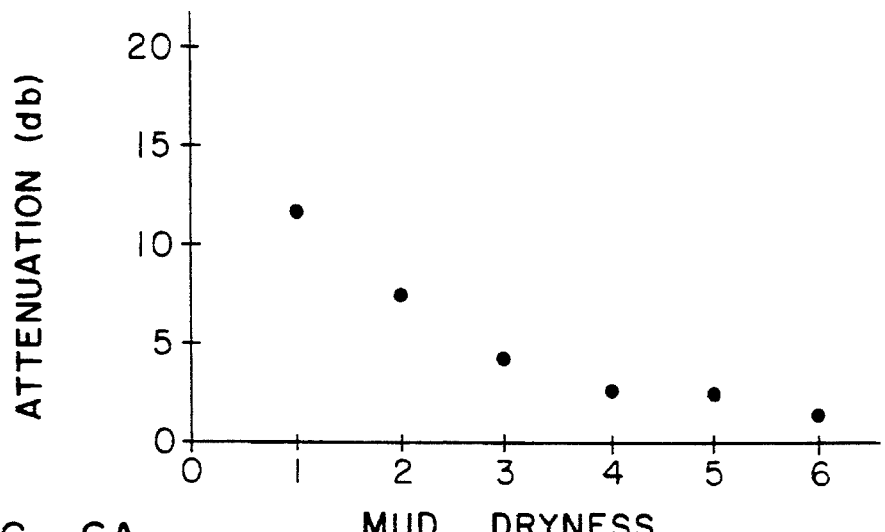
FIG. 6 is composed of FIGS. 6(a), (b) and (c) that cumulatively illustrate the test data associated with a mud thickness of 0.08 inches accumulated on the radome.
Figure 6B:
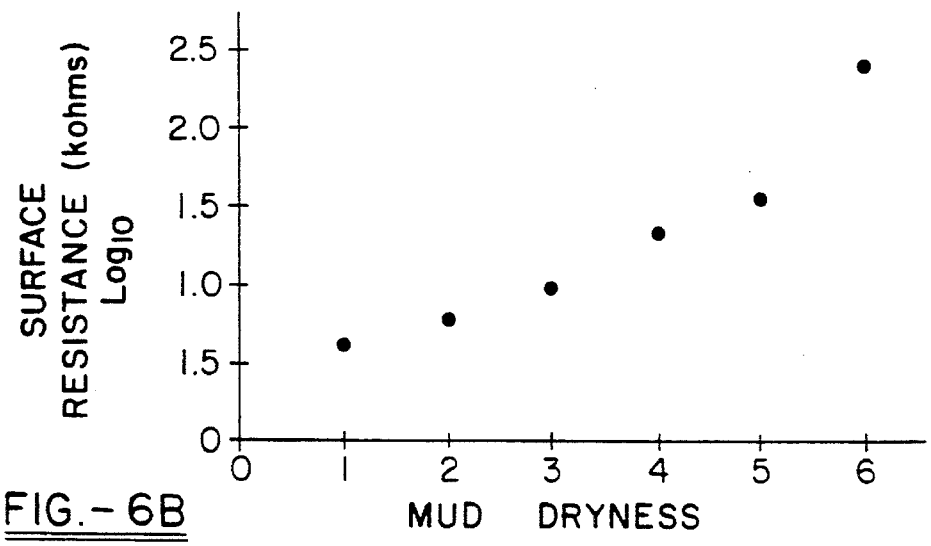
Figure 6C:
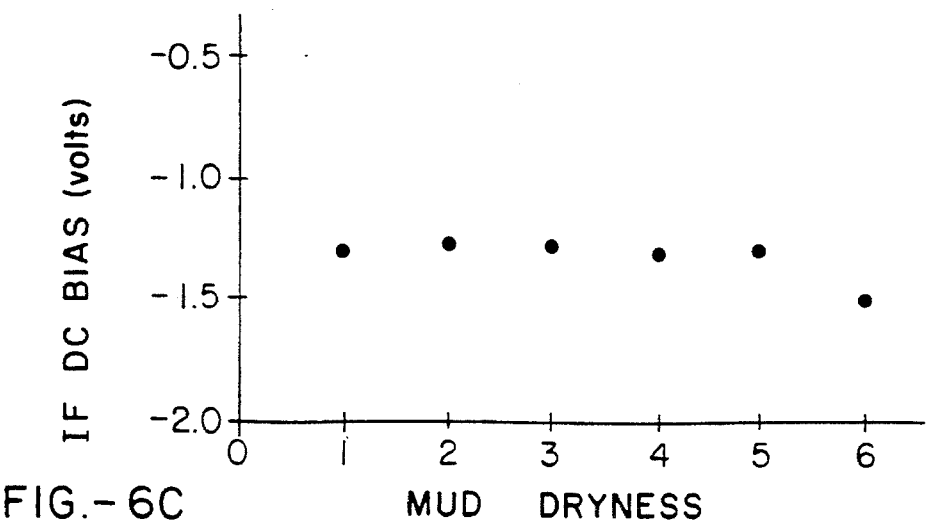
Figure 7A:
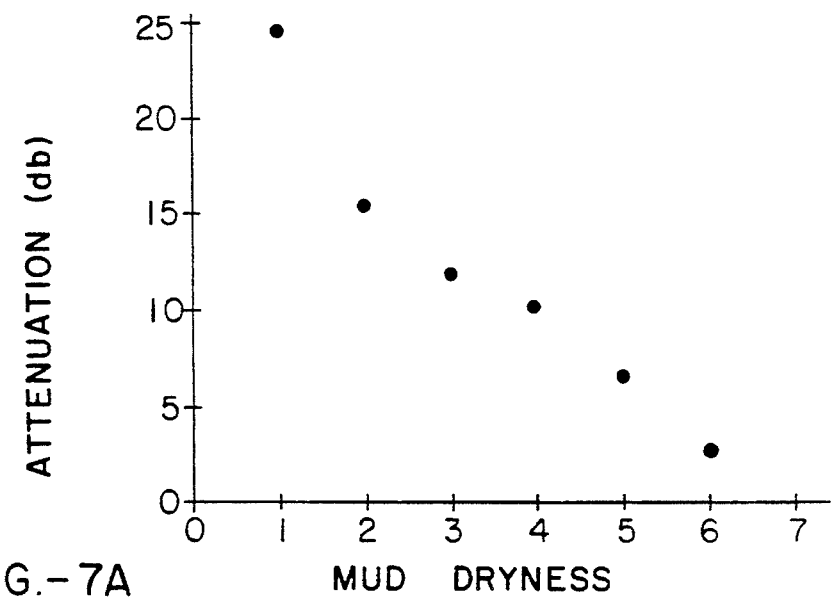
FIG. 7 is composed of FIGS. 7(a), (b) and (c) that cumulatively illustrate the test data associated with a mud thickness of 0.2 inches accumulated on the radome.
Figure 7B:
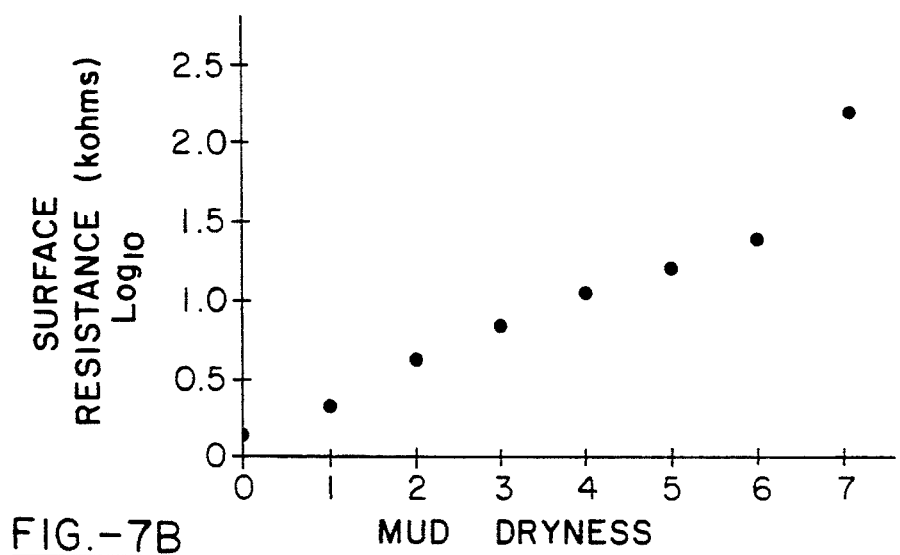
Figure 7C:
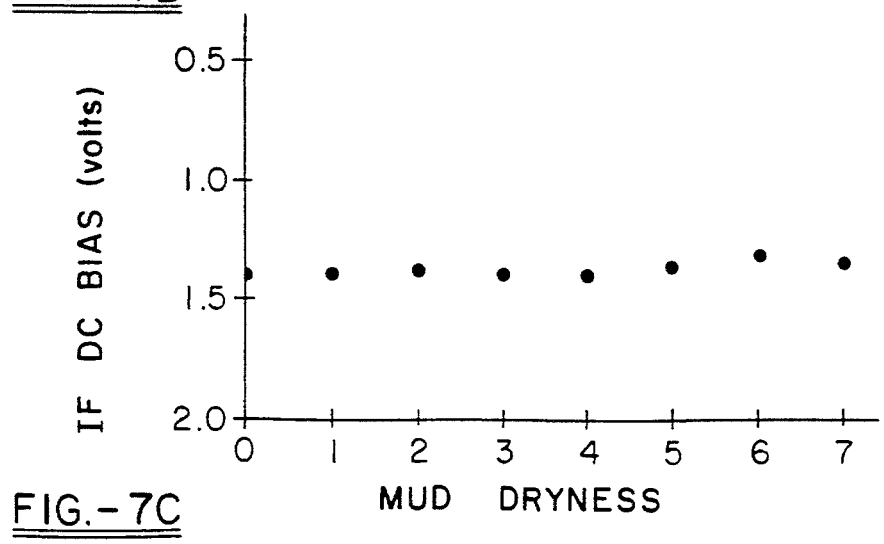

To further support the analysis based on the theoretical model related to expressions (1)–(7), data was collected by means of the test arrangement 46 shown in FIG. 3 and which arrangement 46 comprises a plurality of elements given in Table 3.

TABLE 3

| REFERENCE NO. | ELEMENT |
|---|---|
| 48 | Test Radar |
| 49 | Radar Modulation Circuit |
| 50 | Personal Computer |
| 52 | Analog/Digital (A/D) Converter |
| 54 | Impedance Meter |
| 56 | Target |
| 58 | Microwave Oscillator |
| 60 | Intermediate Frequency (IF) Signal Amplifier |
| 61 | Microwave Mixer |

The test radar 48 comprises a radar modulation unit 49, a microwave oscillator 58, a microwave mixer 61, and an IF amplifier 60. The target return signals 28 are derived from the signals 26 being reflected off of a standard radar target, a 0.1 m metal sphere, e.g., placed at a certain distance, 10 ft., e.g., away from the test radar 48. The mixer 61 downshifts the frequency of the return signal 28 to an intermediate frequency (IF).

In the operation of circuit arrangement 46, the intermediate frequency (IF) signal strength is first calibrated by measuring the strength of signal 28 yielded from an arrangement (antenna and radome) that includes a clear radome, i.e., a radome 20 that is not encumbered by any obstruction material 38. The signal strength measured with a clear radome 20 is used as a signal reference level.

The impedance meter 54 is connected to the electrodes 32 and 34 by way of signal paths 62 and 64. The electrodes 32 and 34 are placed on the surface (not shown in FIG. 3, but shown in FIG. 2) of radome 20. The obstruction material 38 is selectively placed between the spaced-apart electrodes 32 and 34 so as to gather data, such as that to be described with reference to FIGS. (4)–(7). The impedance meter 54 measures the surface resistance (R) and surface capacitance (C), in particular, the electrical resistance and capacitance of the obstruction material 38 located between the spaced-apart electrodes 32 and 34 placed on the outer surface 42 (not shown in FIG. 3) of the radome 20. The measurements of the electrical resistance and capacitance are applied to the personal computer 50, by appropriate means such as the A/D converter 52. The A/D converter 52 also accepts the signals (26 and 28) from the test radar 48 and directs their corresponding digital representations to the personal computer 50. The personal computer 50 collects data, performs mathematical operations on the data, and provides results in terms of signal attenuation, surface resistance, and IF DC bias all of which are to be further described with reference to FIGS. (4)–(7).

In the practice and analysis of this invention, experiments were conducted by using wet mud as the obstruction material 38 and placing various distributions and layers of such mud onto the radome 20, while simultaneously collecting data during the drying process of the mud. Four (4) sets of experiments were performed; the results of which are respectively illustrated in FIG. 4, 5, 6 and 7. FIGS. 4–7 are each composed of segments (*a*), (*b*), and (*c*) which respectively depict the responses of signal attenuation vs. mud dryness, surface resistance R vs. mud dryness, and IF DC bias vs. mud dryness. The signal attenuation is related to signals 26 and 28 but is particularly directed to signal 28 (return signals) which is deterministic of the receiver sensitivity of the radar system 10. The surface resistance R is the electrical resistance of the obstruction material 38 located between the spaced-apart electrodes 32 and 34, and may be expressed as $x=\log_{10}(yk)$, where x is the unknown and y is the value shown on the y axis that is given in kΩ. The IF DC bias is that of the received (echo signal 28) signal having a frequency of about $24 GH_z$. The mud dryness constitute the x axis of each of the FIGS. 4–7, and one end of each axis is denoted by "0" which means "very wet" mud, while the other end of each axis stands for "totally dry" mud. The y axis of FIGS. 4(*a*), 5(*a*), 6(*a*), and 7(*a*) illustrates the signal attenuation given in dB, the y axis of FIGS. 4(*b*), 5(*b*), 6(*b*), and 7(*b*) illustrates the the surface resistance (kΩ) given in $\log_{10}$, and the y axis of FIGS. 4(*c*), 5(*c*), 6(*c*) and 7(*c*) illustrates the DC bias of the intermediate frequency (IF) given in volts.

FIG. 4 illustrates the test data created by an uneven mud obstruction material being placed on the outer surface of radome 20 between electrodes 32 and 34. FIG. 5 illustrates the test data created by a mud obstruction thickness of 0.03 inches being placed on the outer surface of radome 20 between electrodes 32 and 34. FIG. 6 illustrates the test data created by a mud obstruction thickness of 0.08 inches being placed on the outer surface of radome 20 between electrodes 32 and 34. FIG. 7 illustrates the test data created by a mud obstruction thickness of 0.2 inches being placed on the outer surface of radome 20 between electrodes 32 and 34.

A review of FIGS. 4(a), 4(b), 5(a), 5(b), 6(a), 6(b), 7(a) and 7(b), reveals that the surface resistance R and the signal attenuation are monotone functions of "mud dryness." More particularly, the wetter the mud, the less the surface resistance R and the larger the signal attenuation. Conversely, a review of FIGS. 4(c), 5(c), 6(c), and 7(c), reveals that the IF DC bias does not have any direct relationship relative to "mud dryness."

Figure 8:
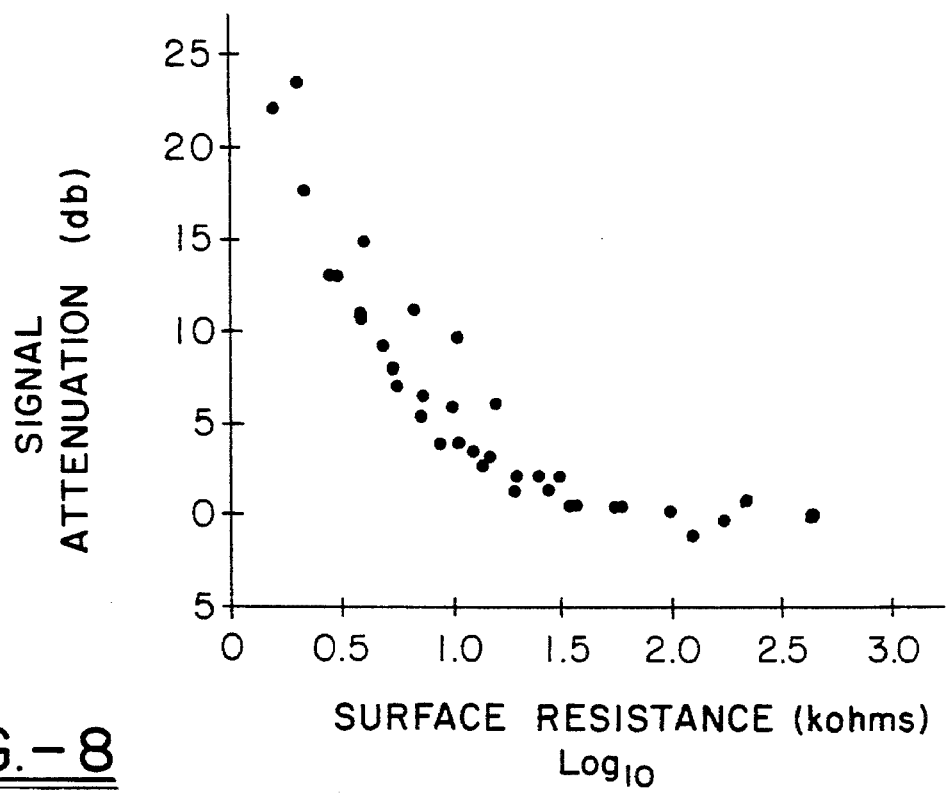
FIG. 8 is a plot of the signal attenuation vs. the surface resistance parameters derived from the cumulative data of FIGS. 4–7.
Figure 9:
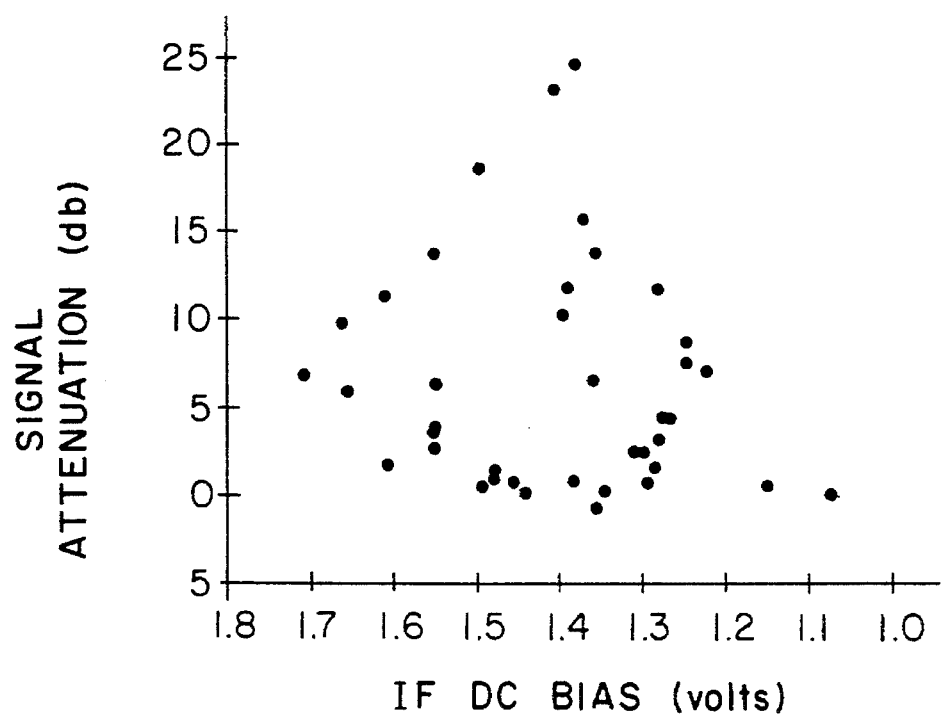
FIG. 9 is a graph of the signal attenuation vs. the IF DC bias derived parameters from the cumulative data of FIGS. 4–7.
Figure 10:
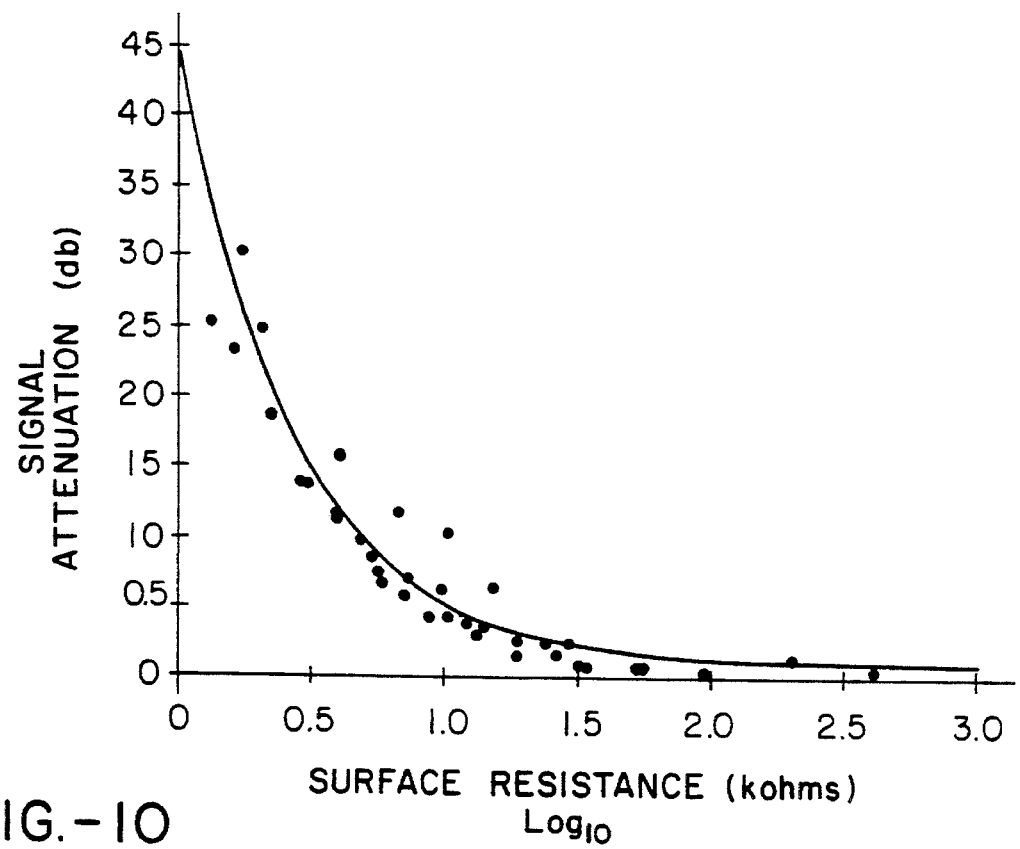
FIG. 10 is a regression curve showing the signal attenuation vs. surface resistance parameters derived from the cumulative data of FIGS. 4–7.

In a further analysis of the present invention, all of the data given in FIGS. 4–7 was plotted in FIGS. 8 and 9 to respectively illustrate the relationship between (1) signal attenuation and surface resistance R, and (2) signal attenuation and IF DC bias. From FIG. 8 it is seen that the signal attenuation is clearly a monotone function of surface resistance. A statistical regression analysis was performed on the experimental data (FIGS. 4–7) and the results of which fit very well and have a relationship given by the below expression 8 and shown in the FIG. 10:

Expression 8:

$$\text{Signal Attenuation (dB)} = 0.896 + 40.413/R(K)$$

where the coefficient of 1/R(40.413) is statistically significant at a confidence level of 0.0001.

From expressions (7) and (8), it is seen that a model obtained from the results of experimental data (FIGS. 4–7) matches very well with the theoretical model (expressions (1)–(6)), and that absorption plays a dominant role, relative to reflection, in the attenuation of the signal 28. This dominant role is apparent, especially when mud is used for the obstruction material and when the test frequency is 24GHz.

Further, from expression (3), it is seen that if the propagation constant $\beta$ and the thickness d of the obstruction material 38 are small, Z will be close to $Z_o$ so that the reflection coefficient $\Gamma$ will be small. Therefore, reflection plays a less important role than absorption in signal attenuation related to the present invention because, in practice, these parameters $\beta$ and d are usually small.

From expression (6) it is seen that the product of the conductivity $\sigma$ and thickness d of the obstruction material 38 provides an indication which is proportional to the microwave attenuation (dB). More particularly, the surface resistance R is correlatable (FIG. 8) to the signal attenuation.

From FIG. 8 it is seen that the measurement of the surface resistance R provides for a relatively accurate determination of the attenuation of the signals that intercept the obstruction material 38 (see FIG. 2). More particularly, as seen in FIG. 8, when the surface resistance R is at a value less than about $\log_{10}$ (1.5 k$\Omega$), the signal attenuation is about three (3) dB. The representative information contained in FIG. 8 may be used to establish a predetermined level, such as three (3) dB, of signal attenuation that is used (as to be described hereinafter with reference to FIG. 12) to notify the operator carrying the radar system 10, that the performance of the system has been degraded to an unacceptable level.

Figure 11A:
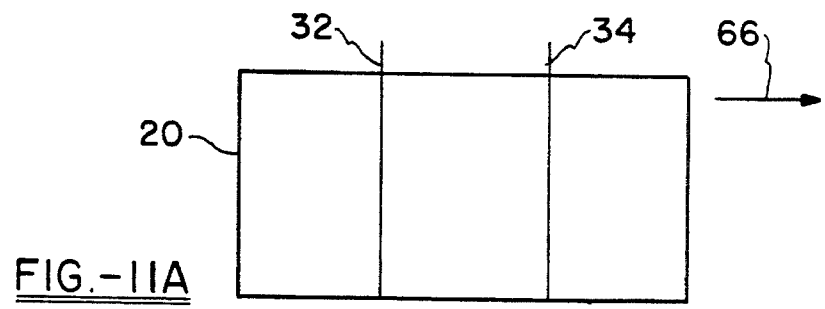
FIG. 11 is composed of FIGS. 11(a) and (b) that illustrate different embodiments of the electrodes of the radome obstruction detection means of the present invention.
Figure 11B:
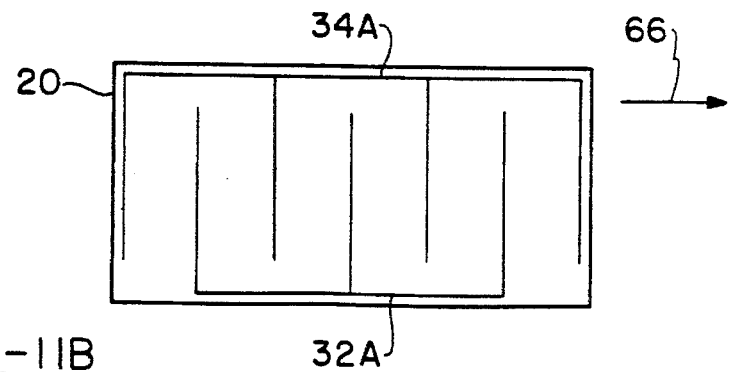

A further feature of the present invention may be described with reference to FIG. 11 which is composed of 11a and 11b, each illustrating a different embodiment of the electrodes 32 and 34 that are placed and affixed to the outer surface 42 of the radome 20. Both FIGS. 11(a) and (b) are top views of the radome 20 and illustrate the radome 20 in its clear (non-operative) state not having any obstruction material 38 between the spaced-apart electrodes 32 and 34. As seen in FIG. 11(a), the electrodes 32 and 34 are arranged to be perpendicular to the direction 66 of electric field ($E_{field}$) of the antenna 18. The diameters of electrodes 32 and 34 should be as small as possible. A second embodiment of electrodes 32A and 32B is shown in FIG. 11(b) and have the same features as the electrodes 32 and 34 of FIG. 11(a), but have an interdigitated arrangement. Testing was performed and it was determined that electrodes 32, 32A, 34 and 34B do not cause any noticeable attenuation or distortion of the received signal 28, nor the transmitted signal 26.

It should now be appreciated that the practice of the present invention provides for electrodes that are used for measuring the surface resistance R of the obstruction material 38 accumulated on the radome 20 and that do not distort nor reduce the amplitude of the signals that are associated with a radar system 10 of FIG. 1.

The operation of the radar system 10, and in particular, the radome obstruction detection means 22 and the control display means 24 of FIG. 1 may be further described with reference to FIG. 12 which illustrates a flow chart comprising a plurality of programming segments given in Table 4.

TABLE 4

| REFERENCE NO. | PROGRAMMING SEGMENT TYPE | NOMENCLATURE |
|---|---|---|
| 68 | Processing | Sense the Radome Surface |
| 70 | Processing | Wait |
| 72 | Decisional | Material* Sensed |
| 74 | Comment | *Obstruction Material |
| 76 | Decisional | Radar Performance Degraded* |
| 78 | Comment | *Obstruction Material Sufficient to Degrade Radar |
| 80 | Output | Inform the Driver |

In general, the operation of the radome obstruction detection means 22 is based upon (1) affixing the spaced-apart electrodes 32 and 34 onto the outer surface of radome 20, (2) connecting an impedance measuring means (part of the radome obstruction detection means 22) to the spaced-apart electrodes and measuring the surface impedance, in particular, the surface electrical resistance R, between the electrodes 32 and 34, and (3) terminating the operation of the radar system, in particular, the antenna 18 when the surface electrical resistance R falls below a predetermined value indicative that the signal attenuation of the related signals has exceeded a predetermined value, such as three (3) dB. The radome obstruction detection means 22 may employ a RF bypass capacitor 36 so as to avoid being disturbed by capacitance effects in its measurement of surface electrical resistance R.

The radome obstruction detection means 22 may accomplish its operating segments by either built-in microprocessing routines or these segments may be accomplished by routines accomplished within a computer or within the radar system 10 itself. Similarly, the control and display means 24 may comprise built-in microprocessing routines or these control and display functions may be accomplished by routines within the on-board computer or the radar system 10.

Figure 12:
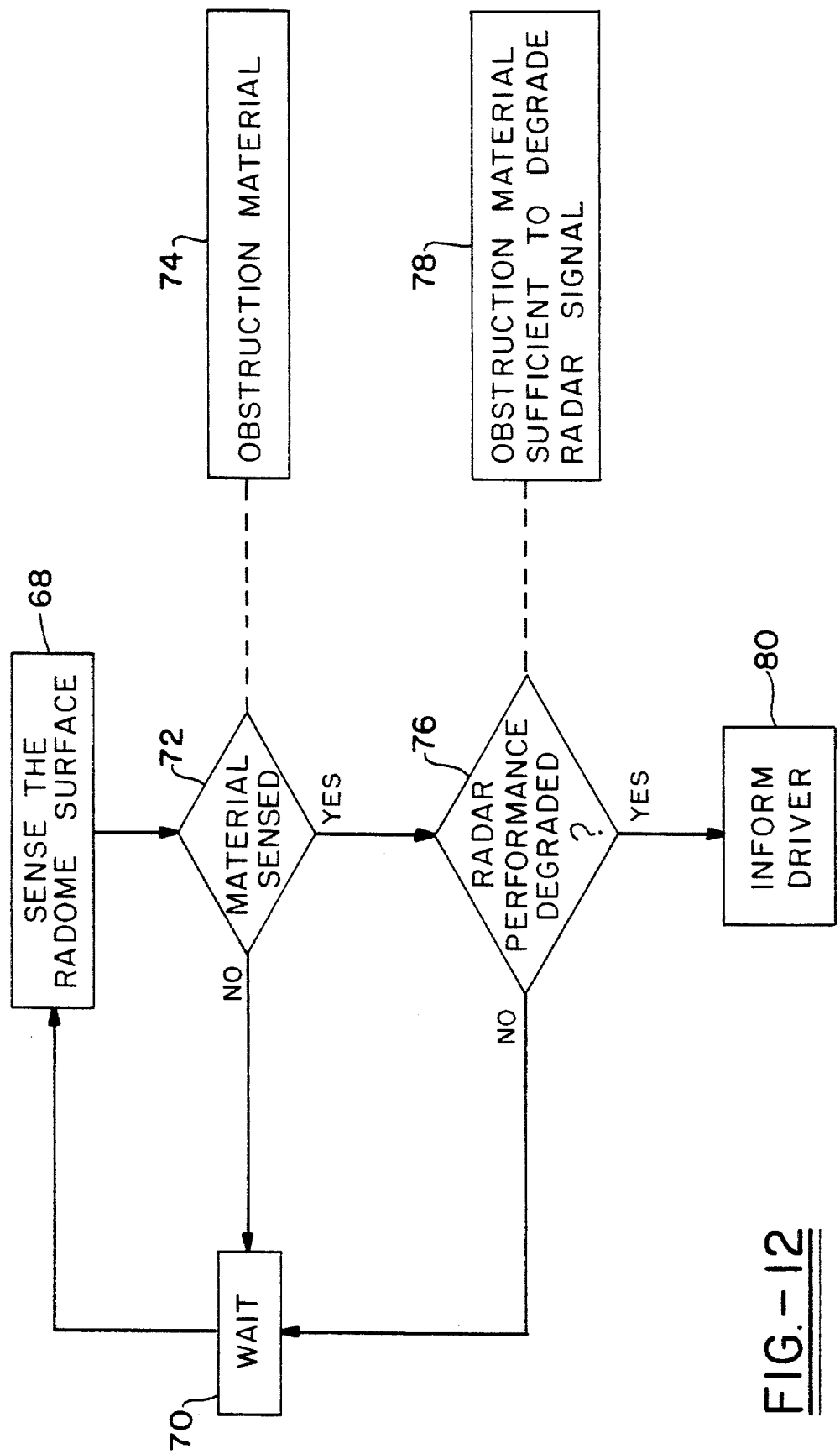
FIG. 12 is a flow chart that illustrates the overall operation of the present invention concerned with the detection of the obstruction material on the radome surface and the notification to the operator that the accumulated obstruction material has reached an unacceptable limit.

The operation of the radome obstruction detection means 22 and the control and display means 24 may be further described with a simultaneous reference to FIGS. 1 and 12. The control and display means 24 activates the radome obstruction detection means 22 which, in turn, performs the processing segment 68 of FIG. 12. The radome obstruction detection means 22 then determines (see segments 72 and 74 of FIG. 12) if any obstruction material is present on radome 20, and if such determination is negative, the radome obstruction detection means 22 then goes into a wait loop (see segment 70 of FIG. 12). However, if the obstruction material is sensed, then the radome obstruction detection means 22 determines, from a predetermined pre-stored value (such as that derived from the information of FIG. 8), if the radar performance is degraded (see segment 76 and 78 of FIG. 12) below an acceptance limit. If such degradation is encountered, the radome obstruction detection means 22 alerts the control and display means 24 which, in turn, notifies the operator that the operational performance of the radar system 10 has degraded below an acceptable value.

It should now be appreciated that the practice of the present invention provides for a novel radar system, wherein spaced-apart electrodes are connected to the outer surface of a radome and an impedance measuring means is connected to the spaced-apart electrodes and measures the surface impedance of the radome, in particular, the electrical resistance R of the obstruction material, and terminates the operation of the radar system when the surface electrical resistance R exceeds a predetermined value indicative that the signal attenuation of the related signals has reached an undesirable level, such as 3 dB.

It should be further appreciated that although the hereinbefore given description of the radar system 10 has been described for automotive and commercial vehicle applications, the principles of the present invention are equally applicable to any radar system or any other system that uses radio transmission waves to convey information and such informational systems may find various domestic, industrial or commercial applications.

We claim:

1. An antenna system comprising:
    (a) an antenna for transmitting and receiving signals;
    (b) a radome sheltering said antenna and having an outer surface susceptible to accumulating obstruction material which has an electrical resistance characteristic;
    (c) a pair of spaced-apart electrodes affixed to said outer surface of said radome;
    (d) means connected to the electrodes for measuring the electrical resistance characteristic of said obstruction material accumulated between said spaced-apart electrodes;
    (e) means for correlating the measured electrical resistance characteristic to a degree of attenuation of said transmitted and received signals due to the presence of said obstruction material on said radome; and
    (f) means for providing a warning indication when a surface impedance measurement corresponding to a predetermined degree of signal attenuation is reached.

2. The antenna system of claim 1, wherein the antenna has an electric field, and the electrodes are arranged to be perpendicular to said electric field.

3. A method for detecting and responding to signal attenuation of an antenna system having an antenna which is sheltered by a radome with an outer surface susceptible to accumulate obstruction material, said method comprising the steps of:
    (a) affixing spaced-apart electrodes onto said outer surface of said radome;
    (b) connecting an impedance measuring means to said spaced-apart electrodes and measuring the surface impedance between said spaced-apart electrodes;
    (c) correlating the measured surface impedance to a degree of signal attenuation of said antenna system due to the presence of said obstruction material on said radome; and
    (d) terminating said operation of said antenna system when a surface impedance measurement corresponding to a predetermined degree of signal attenuation is reached.

* * * * *